W. G. MAXCY AND W. A. RIDEOUT.
DOOR BOTTOM WEATHER STRIP.
APPLICATION FILED FEB. 15, 1917.
1,339,775. Patented May 11, 1920.
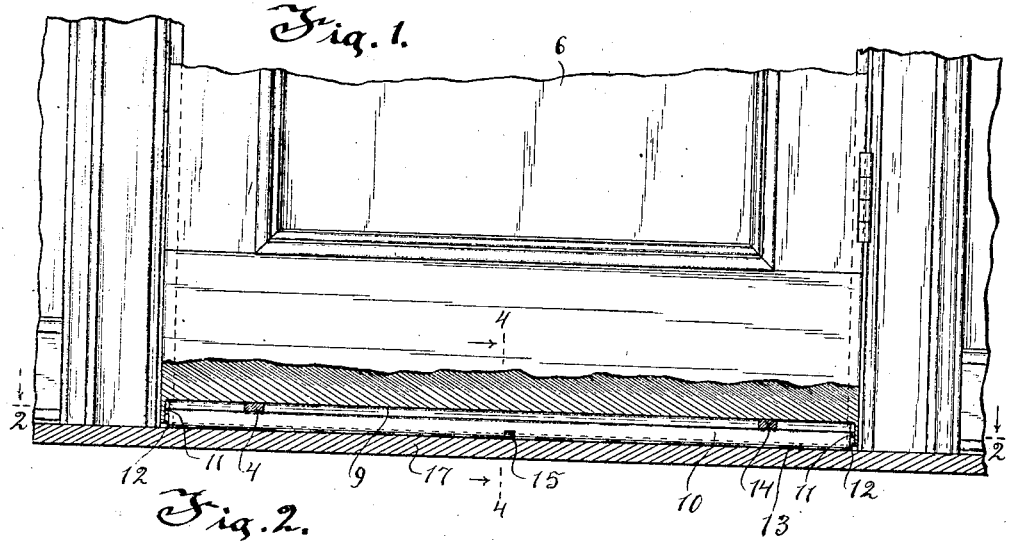
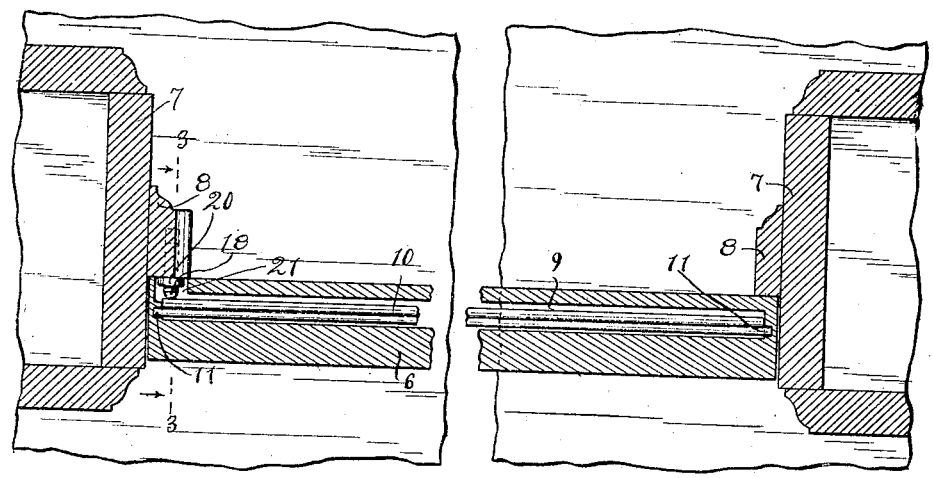
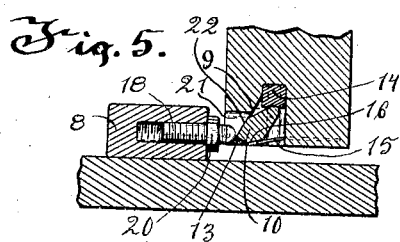
INVENTOR
Warren G. Maxcy
William A. Rideout
By Morsell, Keeney & French
ATTORNEYS

UNITED STATES PATENT OFFICE.

WARREN G. MAXCY AND WILLIAM A. RIDEOUT, OF OSHKOSH, WISCONSIN.

DOOR-BOTTOM WEATHER-STRIP.

1,339,775.   Specification of Letters Patent.   Patented May 11, 1920.

Application filed February 15, 1917. Serial No. 148,737.

*To all whom it may concern:*

Be it known that we, WARREN G. MAXCY and WILLIAM A. RIDEOUT, citizens of the United States, and residents of Oshkosh, in the county of Winnebago and State of Wisconsin, have invented new and useful Improvements in Door-Bottom Weather-Strips, of which the following is a description, reference being had to the accompanying drawings, which are a part of this specification.

The invention relates to weather strips for the bottom of doors.

It frequently happens that when doors are hung or after they have been in place for some time there is a space between the bottom of the door and the floor which allows cold air to pass under the door and into the room and which open air space is also objectionable where privacy is desired as sound will readily travel from the room through this space. To overcome these difficulties I have devised a movable weather strip effecting a closure of the space between the bottom of the door and the floor when the door is closed and automatically movable out of this space when the door is opened so as not to interfere with its opening.

The invention is further designed to provide a weather strip swingingly mounted in the bottom of the door and held within the bottom when the door is open and moved down into operative position by means on the door jamb.

The invention further consists of the several features hereinafter set forth and more particularly defined by claims at the conclusion hereof.

In the drawings:

Figure 1 is a view of the device embodying the invention, parts of the door being broken away to show the device applied thereto;

Fig. 2 is a section taken on the line 2—2 of Fig. 1;

Fig. 3 is a section taken on the line 3—3 of Fig. 2;

Fig. 4 is a section taken on the line 4—4 of Fig. 1;

Fig. 5 is a section similar to Fig. 3, showing the strip in raised position.

In the drawings we have shown a door 6 of usual construction in which the door is mounted to swing between the jambs 7 and in which the jamb strips 8 are provided adjacent one side of the door.

The bottom of the door is provided with a longitudinally extending recess 9 and the weather strip 10 is pivotally swingingly mounted in said recess by pins 11 projecting into slots 12 in the door at the ends of said recess, said slots permitting limited sliding movement of the strip with respect to the door. The edge of the weather strip is provided with a felt covering 13 and the upper edge normally presses against rubber bumpers 14, said strip being held in its inoperative position within the recess 9 in the door by means of a flat spring 15 secured to the door and pressing against the inclined side 16 of the strip.

Means are provided for moving the weather strip to operative position into the space between the bottom of the door and the floor 17 consisting of an abutment or stud 18 having threaded engagement with one of the jamb strips 8 for adjusting the stud 18 with respect to said block, a lock nut 20 being provided for securing said stud in adjusted position. The door 6 is provided with an opening 21 in line with the stud and communicating with the recess 9 to permit said stud to engage the inclined side 22 of the strip 10 when the door is being moved to closed position and to force the strip downwardly to operative position against the action of the spring 15 as shown in Figs. 3 and 4. The rubber bumpers 14 permit play between the ends of the strip so that even if the bottom of the door is uneven the strip will be moved down so that its lower edge engages the floor when in operative position. The stud 18 is adjustably mounted for the purpose of moving the strip 10 a greater or less distance downwardly depending upon the height of the bottom of the door from the floor or sill.

The invention thus exemplifies a simple and efficient device well adapted for the purpose described.

What we claim as our invention is:

1. The combination with a swinging door having a recess in its bottom extending throughout the width thereof, of a weather strip swingingly and slidably mounted in said recess, yielding backing members disposed within said recess between the top wall of the recess and the upper edge of the strip, a spring for yieldingly normally retaining said strip in inoperative position within said recess, and an abutment adjacent the door for engaging said strip when the door is closed to move the same outwardly of said recess against the action of said spring to render the same operative.

2. The combination of a swinging door having a recess in its bottom extending substantially throughout its entire width and vertical guide ways extending throughout said strip, a weather strip having a rounded upper edge and eccentric journals mounted in said guide ways permitting the vertical sliding and swinging movements of said strip, rubber bumpers disposed within the recess intermediate its ends and engaging the upper edge of the strip, a spring having one end secured to the door and its other end disposed within the recess and impinging against the strip to hold the same against said bumpers and normally in inoperative position concealed within the recess, and an abutment adjacent the door for engaging the strip when the door is closed to move the same to operative position outwardly of the recess.

In testimony whereof, we affix our signatures.

WARREN G. MAXCY.
WILLIAM A. RIDEOUT.